United States Patent [19]

Jung et al.

[11] 3,928,074

[45] Dec. 23, 1975

[54] PRIMARY CELL WITH NEGATIVE ELECTRODE

[75] Inventors: Gerd Jung; Jakob Bauer, both of Ellwangen, Germany

[73] Assignee: Varta Batterie Aktiengesellschaft, Germany

[22] Filed: Apr. 17, 1974

[21] Appl. No.: 461,512

[30] Foreign Application Priority Data

Apr. 21, 1973 Germany.......................... 2320555

[52] U.S. Cl............. 136/100 M; 136/102; 136/154
[51] Int. Cl.².................................... H01M 17/00
[58] Field of Search............. 136/100, 154, 155, 30, 136/107

[56] References Cited

UNITED STATES PATENTS

| 3,073,884 | 1/1963 | Pinkerton | 136/154 X |
|---|---|---|---|
| 3,468,716 | 9/1969 | Eisenberg | 136/100 R |
| 3,546,022 | 12/1970 | Busch et al. | 136/155 X |
| 3,653,964 | 4/1972 | Lee | 136/154 X |
| 3,778,310 | 12/1973 | Garth | 136/100 R |

*Primary Examiner*—John H. Mack
*Assistant Examiner*—C. F. Lefevour
*Attorney, Agent, or Firm*—Weiser, Stapler & Spivak

[57] ABSTRACT

A primary cell and battery having a polyethylene glycol ether as a corrosion inhibitor.

9 Claims, No Drawings

PRIMARY CELL WITH NEGATIVE ELECTRODE

An important object of the invention is a primary cell containing a zinc or magnesium negative electrode, a positive depolarizer electrode and a corrosion inhibitor.

As it is known, the electrical properties of primary cells are not constant, but depend on several factors. The deterioration of these properties is caused by several physical or chemical processes, wherein the ambient temperature is of decisive importance.

Corrosive changes of the materials of the negative electrode (zinc, magnesium, for instance), which are both metals with normally a negative potential, have a substantial influence on the aging process during storage.

During the discharge of the cell, a corrosive sidereaction (2) takes place along electrochemical reaction (1).

$$Me \rightarrow Me^{2+} + 2\,e \qquad (1)$$
$$Me + 2H^+ \rightarrow Me^{2+} + H_2 \qquad (2)$$

Reaction 2 is a useless reaction, which should be prevented.

The inhibitors used at present for decreasing the zinc or magnesium corrosion are mainly mercury (II) chloride and chromates.

For example, soluble alkaline chromates and/or alkaline earth-chromates are preferably used in the electrode system Mg/electrolyte/pyrolusite; whereas in the systems zinc/$ZnCl_2$—$NH_4Cl$—electrolyte/pyrolusite and zinc/$ZnCl_2$-electrolyte/pyrolusite mercury-II-chloride, termed herein for short sublimate, is usual.

The use of these inhibitors, particularly of sublimate, requires strong safety measures. Moreover, the disposal of used batteries is generally carried out in a manner over which there is no control and will represent in the future a major factor of pollution, which cannot be ignored.

Therefore is it an object of the invention to provide a non-poisonous highly effective corrosion inhibitor.

This object is attained, according to the invention by providing a polyethylene glycol monoalkyl ether which is soluble in the cell system, especially in the electrolyte.

The polyethylene glycol monoalkyl ethers which are useful in accordance with the invention may be designated by the general formula

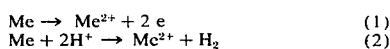

wherein the values for $x$ and $y$ are not critical, but for satisfactory results, $x$ can be between 6 and 100 and $y$ representing the alkyl residue, being between 1 and 20. For best results, there are selected soluble ethers having a fatty acid ether residue wherein $y$ is between 8 to 22, usually between 8 and 18. It is desirable that $x$ represent a value between 10 and 30. Typical ethers are the following:

polyethylene glycol monolauryl ether, $x = 23$
polyethylene glycol monocetyl ether, $x = 20$
polyethylene glycol monooctyl ether, $x = 35$
polyethylene glycol monostearyl ether, $x = 15$
polyethylene glycol monoeicosanoyl ether, $x = 10$ and other like soluble ethers. Polyethylene glycol ethers wherein the alkyl residue represents a mixture of various fatty acids, as are commonly available commercially can also be used. These are commonly available from vegetable or animal sources like peanut, olive, or coconut oil containing varying amounts of caprylic, capric, lauric, myristic, palmitic, stearic, oleic and linoleic acids. Unsaturated acids may also be present. What is determinative in accordance with the invention is that the ether be soluble in the electrolyte used in the cell. If necessary the ether should be previously dissolved in other solvents, for example in alcohol. The solvents used must not have any influence on the characteristics of the cells. Preferred at this time is polyethylene glycol monolauryl ether or PEL, (wherein $x = 23$ and $y = 12$).

The weight of the inhibitor, which is added, can range from 0.001 to 2% preferably to 0.01 – 0.2% by weight of the depolarizer mass. Greater or smaller amounts tend to be wasteful or inadequate for best results.

The inhibitor can be admixed to the electrolyte mass or added to the outer electrolyte. However, it is also satisfactory to introduce it into the separator lining.

Typical test results, obtained with the primary cell containing the admixture according to the invention, are further illustrated below.

These examples are not intended to limit the invention in any way whatever.

The most effective results are found with types of electrolytes from weakly acid to weakly basic characteristics.

EXAMPLE I

Negative magnesium electrode

A primary cell is made up using the alloy $Mg(Al)_2Zn$ (2% aluminum, 1% zinc) for the electrode. It is tested as follows.

Ungreased tins of the above alloy (1.2 g; 1 mm thickness) are positioned into tightly sealable weighing bottles, 40 ml of the respective electrolyte are added and finally the bottles were stored for one month at ambient temperature. The tins are dried and weighed again after etching in a $CrO_3$ bath.

The bath composition used removed only the adherent layers and did not attack the material itself.

The following observations were made.

| Electrolyte | Addition | Loss of Weight | |
|---|---|---|---|
| | | mg | % |
| 26% $Mg(ClO_4)_2$ | — | 1200 | 100 |
| 26% $Mg(ClO_4)_2$ | 0.5% PEL | 200–250 | 16–21 |

The useful effect of the PEL is readily apparent. Similarly satisfactory results are obtained using 0.2% of PEL. Also when a polyethylene glycol monostearyl ether ($x = 15$) is used, a comparable satisfactory effect is observed.

EXAMPLE II

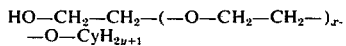

The effect of the inhibitors, used according to the invention has been tested in Leclanché-cells of the above system. The results obtained with cells of size IEC R20 are described by way of illustration only, as follows:

The batteries were manufactured with the following materials:
The negative electrode: Zn-alloy (of customary cells), The positive electrode: depolarizer mix e.g. of
50% pyrolusite
13% conducting material (carbon black and graphite)
14% ammonium chloride
1% zinc oxide
5% zinc chloride
17% water
+ inhibitor (solved in the electrolyte; if necessary, dissolved before in a little amount of alcohol)
Weight of the positive electrode: about 50g,
positive abducting: carbon rod, and
separator: lining paper coated with electrolyte.

Test results:

| Inhibitor | Storage | HgCl$_2$ | PEL | PEL |
|---|---|---|---|---|
| Concentration in %/weight of the mix | | 0.04 | 0.04 | 0.08 |
| Cell-voltage (Volts) | 0 | 1.74 | 1.72 | 1.72 |
| | T3 | 1.69 | 1.69 | 1.68 |
| Current in short circuit (Amps.) | 0 | 25 | 24 | 23 |
| | T3 | 19 | 19 | 18 |
| Discharge by lamp | 0 | 932' | 948' | 948' |
| | T3 | 880' | 890' | 900' | daily 4' discharge in hourly intervals of 1h – 8h at a load of 4 ohms until a discharge cut off voltage of 0.9 V was reached

| Discharge by transistor | 0 | 88h | 85h | 84h |
|---|---|---|---|---|
| | T3 | 83h | 82h | 79h | daily 4 h discharge at a load of 20Ω until a discharge cut off voltage of 0.9 V was reached

| Discharge by motor | 0 | 285' | 238' | 255' |
|---|---|---|---|---|
| | T3 | 237' | 235' | 234' | daily 1 h discharge, 5 times per week, at a load of 500 mA until a discharge cut off voltage of 1.0 V was reached

* 0 = fresh condition,
T3 = 3 months storage at 45° C

The beneficial effect of PEL is apparent under various conditions, even upon storage for several months or elevated temperatures. When polyethylene glycol monoctyl ether is substituted in the above tests for PEL comparable results are obtained. Corrosion resistance is likewise increased when instead of PEL there is used polyethylene glycol monocetyl ether in an amount of 0.2% of the depolarizer mass.

EXAMPLE III

System zinc/ZnCl$_2$ — electrolyte/pyrolusite

The inhibitors, used according to the invention, have also been tested in cells with pure zinc chloride electrolyte. The results of IEC R20 cells, which are manufactured of the following electrode materials, are given as examples only.

The negative electrode: Zn-alloy, as usual in cells
The positive electrode: depolarizer mix, for example:
50% pyrolusite
12% conducting material (carbon black + graphite)
1% zinc oxide
12% zinc chloride
25% water
+ inhibitor (solved in the electrolyte, if necessary before dissolved in a little amount of alcohol).
Weight of the positive electrode: about 50 g,
positive abduction: carbon rod,
separator: lining paper coated with electrolyte.

Test results:

| Inhibitor | Storage* | HgCl$_2$ | PEL | PEL |
|---|---|---|---|---|
| Concentration in %/weight of the mix | | 0.03 | 0.03 | 0.06 |
| Cell voltage (V) | 0 | 1.66 | 1.65 | 1.64 |
| | T3 | 1.62 | 1.62 | 1.62 |
| Current in short circuit (A) | 0 | 11.3 | 11.1 | 10.8 |
| | T3 | 7.1 | 7.3 | 7.1 |
| Discharge by lamp | 0 | 1026' | 1023' | 1041' |
| | T3 | 900' | 940' | 910' | daily 4' discharge in hourly intervals of 1h – 8h at a load of 4Ω until a discharge cut off voltage of 0.9 V was reached

| Discharge by transistor | 0 | 90.2h | 89.5h | 89.5h |
|---|---|---|---|---|
| | T3 | 85.0h | 84.0h | 86.0h | daily 4h discharge at a load of 20Ω until a discharge cut off voltage of 0.9 V was reached

| Discharge by motor | 0 | 248' | 231' | 227' |
|---|---|---|---|---|
| | T3 | 209' | 195' | 204' | daily 1 h discharge, 5 times per week, at a load of 500 mA until a discharge cut off voltage of 1.0V was reached

* 0 = fresh product,
T3 = 3 months storage at 45° C

When polyethylene glycol monostearyl ether is used instead of PEL in a concentration of 1% by weight, likewise long term corrosion resistance is observed. Disposal of the used battery presents no risks or pollution problems.

From the preceding results it is evident that the polyethylene glycol monoalkyl ethers used in accordance with the invention show an inhibitory effect, as well as with negative magnesium as well as zinc electrodes.

From the examples II and III it is apparent that neither a loss of the electrical values nor a decreasing of the discharge capacity after storage under tropical conditions result in comparison with the inhibitory effect of sublimate.

This surprisingly good result shows that it is possible to replace the conventional poisonous sublimate by harmless organic compounds according to the present invention.

Pollution is also prevented, without sacrifice of cell quality.

Other aspects of the primary batteries of the invention are known from various standard literature references. See for instance: *The Encyclopedia of Electrochemistry*; Ed. Hampel, Reinhold Publishing Corporation, New York, N.Y. 1964., especially pages 70 to 76 which are incorporated herein by reference.

We claim:

1. Primary cell with a negative zinc or magnesium electrode and a positive depolarizer electrode and an electrolyte comprising a soluble polyethylene glycol monoalkyl ether, as corrosion inhibitor, the alkyl having from eight to 22, and preferably from eight to 18 carbon atoms.

2. The primary cell of claim 1, comprising polyethylene glycol monoalkyl ether in an amount of 0.001 to 2% by weight of the total weight of the depolarizer mix.

3. The primary cell of claim 1, wherein the corrosion inhibitor is a polyethylene glycol monolauryl ether.

4. The primary cell of claim 1 comprising an electrolyte mass and wherein the corrosion inhibitor is admixed to said mass.

5. The primary cell of claim 1, comprising a separator which includes lining paper and wherein the corrosion inhibitor is in said lining paper.

6. The primary cell according to claim 1, comprising an outer electrolyte and wherein the corrosion inhibitor is in admixture with said outer electrolyte.

7. The cell of claim 2 wherein the amount of polyether is 0.01 to 0.2% of the depolarizer mass.

8. A battery comprising a multiplicity of cells of claim 1.

9. The battery of claim 8 wherein the inhibitor is polyethylene glycol monolauryl ether.

\* \* \* \* \*